(12) United States Patent
Inoue et al.

(10) Patent No.: US 9,944,341 B2
(45) Date of Patent: Apr. 17, 2018

(54) CONNECTING STRUCTURE OF VEHICLE COMPONENT PARTS

(71) Applicants: HONDA MOTOR CO., LTD., Tokyo (JP); Nifco Inc., Yokohama-shi, Kanagawa (JP)

(72) Inventors: Yusuke Inoue, Wako (JP); Toshinori Nakano, Wako (JP); Kenichi Misaki, Wako (JP); Hayato Takei, Wako (JP); Akihiro Kawabata, Wako (JP); Hajime Naoi, Yokohama (JP)

(73) Assignees: HONDA MOTOR CO., LTD., Tokyo (JP); NIFCO INC., Yokohama-Shi (JP)

( * ) Notice: Subject to any disclaimer, the term of this patent is extended or adjusted under 35 U.S.C. 154(b) by 441 days.

(21) Appl. No.: 14/431,041

(22) PCT Filed: Sep. 26, 2013

(86) PCT No.: PCT/JP2013/076160
§ 371 (c)(1),
(2) Date: Mar. 25, 2015

(87) PCT Pub. No.: WO2014/051012
PCT Pub. Date: Apr. 3, 2014

(65) Prior Publication Data
US 2015/0239519 A1   Aug. 27, 2015

(30) Foreign Application Priority Data

Sep. 28, 2012 (JP) ................................. 2012-218269

(51) Int. Cl.
*F16B 5/06* (2006.01)
*B62J 23/00* (2006.01)
(Continued)

(52) U.S. Cl.
CPC ............... *B62J 23/00* (2013.01); *B62J 17/00* (2013.01); *B62J 35/00* (2013.01); *F16B 5/0642* (2013.01);
(Continued)

(58) Field of Classification Search
CPC ........ F16B 5/0642; F16B 5/0657; F16B 5/07; B62J 23/00; B62J 35/00
See application file for complete search history.

(56) References Cited

U.S. PATENT DOCUMENTS

| 1,021,185 A | * | 3/1912 | Foster | ..................... F16B 12/58 |
| | | | | 403/256 |
| 2,870,667 A | * | 1/1959 | Murtaugh | ............. E02F 9/2841 |
| | | | | 37/457 |

(Continued)

FOREIGN PATENT DOCUMENTS

| JP | 2007-530355 | 11/2007 |
| JP | 2010-274850 | 12/2010 |

(Continued)

OTHER PUBLICATIONS

International Search Report, dated Dec. 24, 2013 (Dec. 24, 2013).

*Primary Examiner* — Jonathan P Masinick
(74) *Attorney, Agent, or Firm* — Rankin, Hill & Clark LLP

(57) ABSTRACT

Lateral sides of an engine and a fuel tank are covered with a tank cowling formed by connecting a front cowling and a rear cowling. The front cowling is provided with a flange in which a through hole is formed. The long sides of the through hole are formed in parallel with a cylinder axis of a cylinder section. A gate provided on a lower connecting edge portion of the rear cowling with which the flange overlaps is inserted into the through hole and connected by the clip. The front cowling and the rear cowling are fastened through a bolt on a vehicle body side above and below the connecting (Continued)

section by the clip. With this structure, the force applied to the connecting section is reduced and the connecting section is decreased in size.

5 Claims, 10 Drawing Sheets

(51) Int. Cl.
    *B62J 35/00*     (2006.01)
    *B62J 17/00*     (2006.01)
    *F16B 21/12*     (2006.01)

(52) U.S. Cl.
    CPC ........... *F16B 5/0657* (2013.01); *F16B 21/125* (2013.01); *Y10T 403/7075* (2015.01)

(56) References Cited

U.S. PATENT DOCUMENTS

| | | | |
|---|---|---|---|
| 5,897,278 A * | 4/1999 | Frattarola | F16B 21/02 411/350 |
| 9,004,568 B2 * | 4/2015 | Inoue | B62J 17/00 24/453 |
| 9,103,361 B2 * | 8/2015 | Tanabe | F16B 2/20 |
| 2006/0219450 A1 * | 10/2006 | Misaki | B62J 17/02 180/68.4 |
| 2012/0227219 A1 * | 9/2012 | Kabeya | B60R 11/0217 24/453 |
| 2013/0015007 A1 * | 1/2013 | Inoue | B62J 23/00 180/68.4 |
| 2013/0199001 A1 * | 8/2013 | Jagoda | F16B 5/0657 24/453 |
| 2015/0252829 A1 * | 9/2015 | Naoi | F16B 5/0642 24/580.1 |

FOREIGN PATENT DOCUMENTS

| | | |
|---|---|---|
| JP | 2011-059535 | 3/2011 |
| JP | 2011-152847 | 8/2011 |
| JP | 2013-228068 | 11/2013 |
| WO | 2005/097588 | 10/2005 |

\* cited by examiner

Fig.5
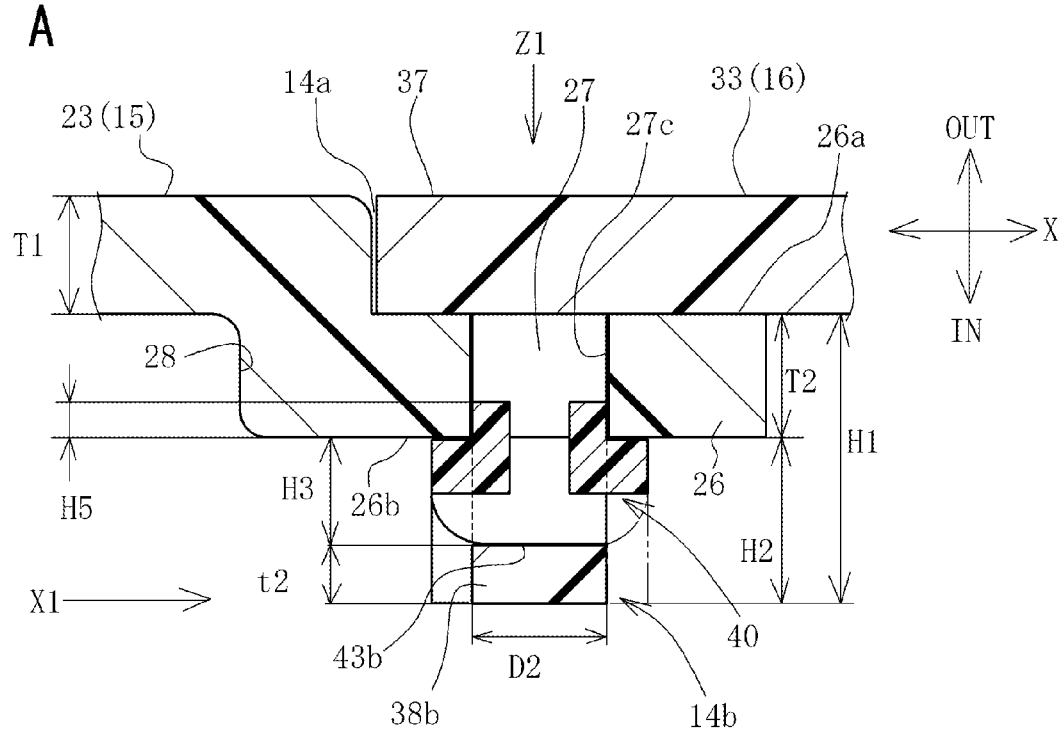
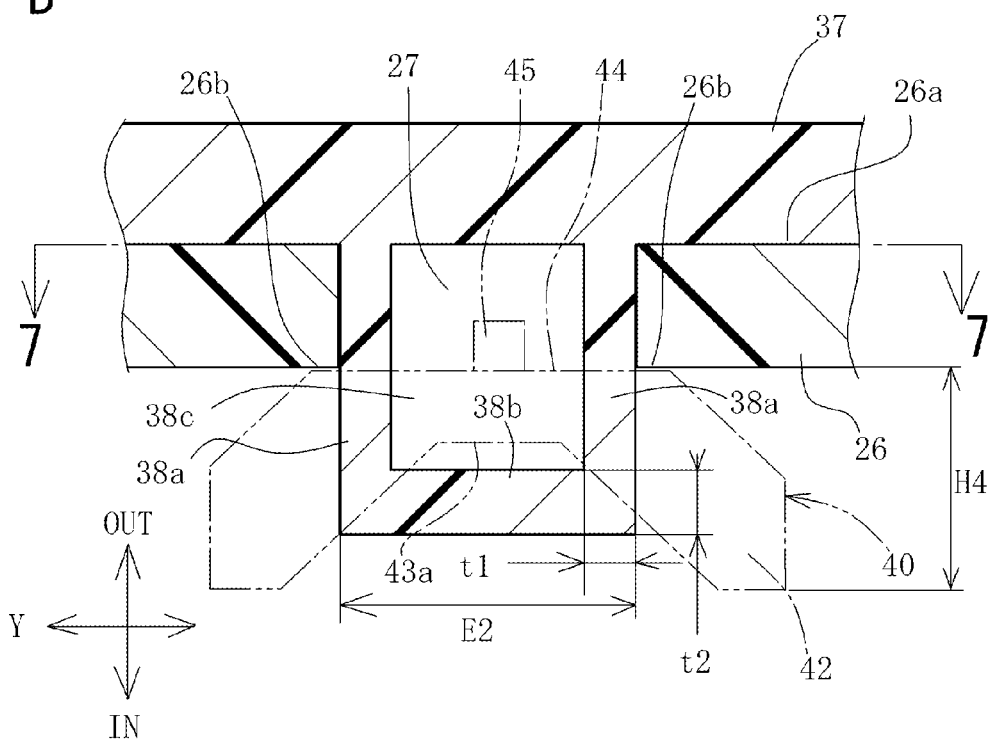

*Fig.6*
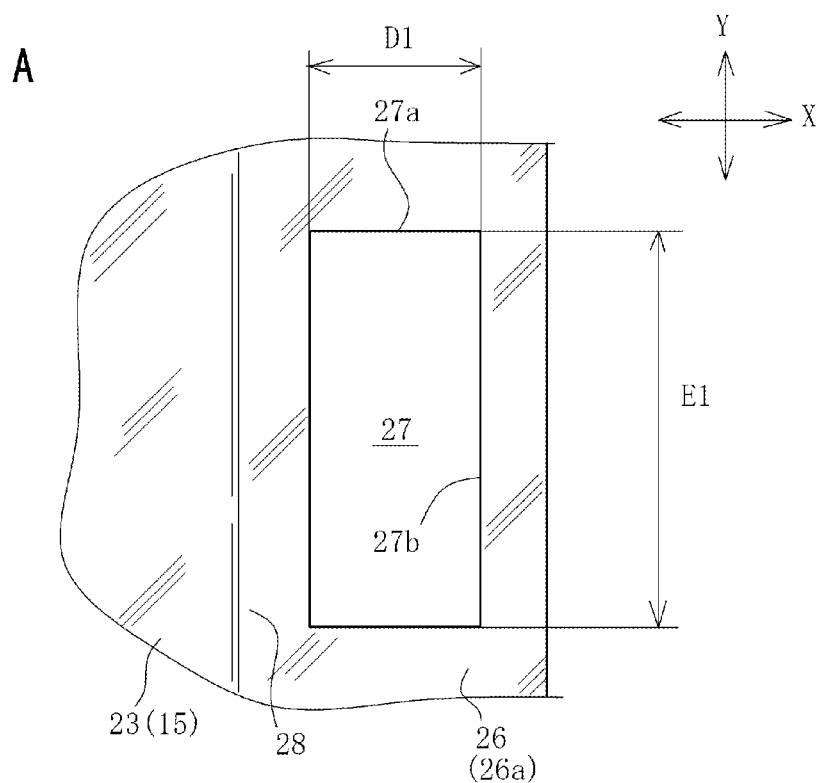
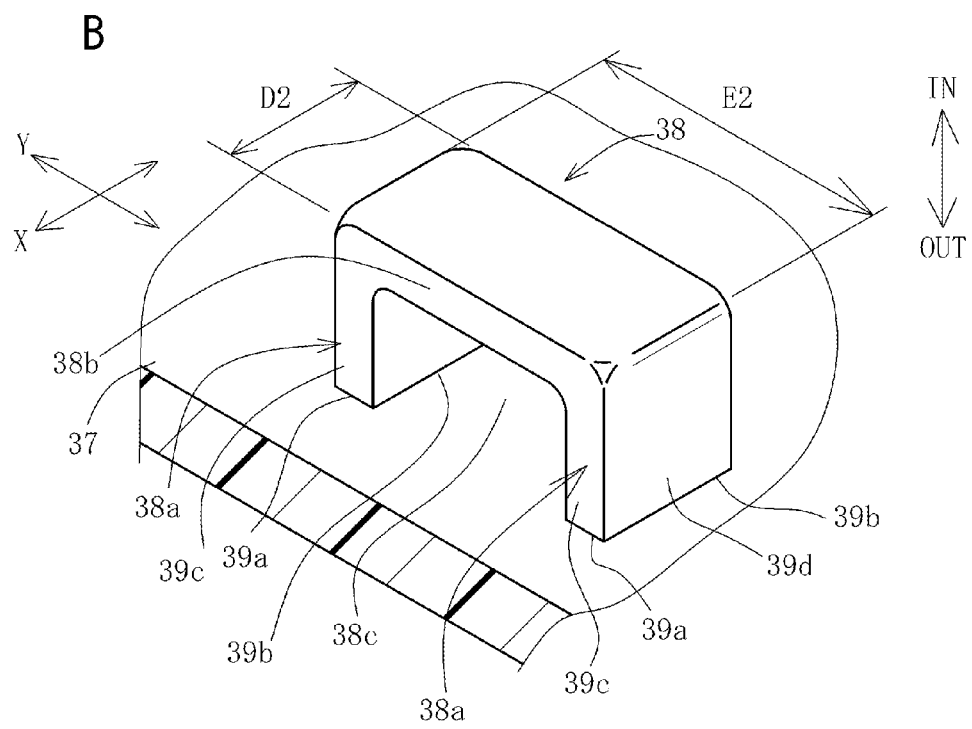

CONNECTING STRUCTURE OF VEHICLE COMPONENT PARTS

TECHNICAL FIELD

The present invention relates to a connecting structure of vehicle component parts in order for connecting a plurality of vehicle component parts such as forwardly and rearwardly divided cowlings by a clip in a straddle type vehicle.

BACKGROUND ART

In a cowling member for a straddle type vehicle, since parts of different materials or colors are assembled into a single cowling member, a plurality of cowling members which are different in material or the like are formed separately and combined together to form the single cowling member. When combining a plurality of cowling, there are many methods like combining by a screw, by gluing and so on.

Moreover, there is disclosed a connecting structure in which a first arresting element is protruded from one cowling member and a second arresting element is protruded from the other cowling member. The first and second arresting elements are connected in a buckle fashion and an engaging section therebetween is held firmly by a separate clip (see a patent reference 1).

PRIOR ART REFERENCE

Patent reference 1: Japanese Unexamined Patent Application Publication (Translation of PCT application) JP 2007-530355 A.

DISCLOSURE OF THE INVENTION

Problem to be Solved by the Invention

By the way, although, when being connected in the buckle fashion as seen in the above described patent reference 1, workability is satisfactory, the arresting elements are large-sized, so that the cowling member becomes larger. As a result, due to the arresting elements, the vehicle becomes larger and there is difficulty in space layout. Therefore, it is required to make the arresting elements smaller and to improve the connection of the cowlings. The present invention has been made with a view to fulfilling such requirement.

Means for Solving the Problem

In order to solve the above mentioned problem, according to a first aspect of the present invention, a connecting structure of vehicle component parts comprises a first member made of resin, a second member made of resin, and a clip for connecting the first and second members, wherein the first member and the second member each are fastened to a vehicle, the first member is provided with a rectangular through hole which has the short sides and the long sides, the second member is provided with a gate which passes through the through hole, the gate is formed substantially in a U-shape which includes a pair of leg portions projecting from a surface of the second member and a top portion connecting each of projecting ends of the leg portions, the pair of leg portions is configured to be arranged along the short sides of the through hole when passing through the though hole, and wherein the clip connects the first member and the second member by engagement with the through hole and the gate in a condition where the gate passes though the through hole.

According to a second aspect of the present invention, in a connecting structure of vehicle component pars as defined in the first aspect, the first member and the second member are a first cowling and a second cowling each of which covers a part of the vehicle.

Further according to a second aspect of the present invention, in a connecting structure of vehicle component parts as defined in the first aspect, the first cowling and the second cowling are fastened to the vehicle respectively, and at least one of the first and second cowlings has a plurality of fastening sections.

According to a third aspect of the present invention, in a connecting structure of vehicle component parts as defined in the fourth aspect, the fastening sections are fastened by a screw or by insertion.

According to a fourth aspect of the present invention, in a connecting structure of vehicle component parts as defined in the first to third aspect, a mating line formed in a contact section between the first cowling and the second cowling in the vicinity of the connecting section has a linear portion, and the linear portion is arranged in parallel with the long sides of the through hole.

Effects of the Invention

According to the first aspect of the present invention, since the first member and the second member each are fastened to a vehicle, the stress on the connecting section can be reduced. Therefore, the clip can be small-sized.

In addition, when the clip is inserted into a portion projecting outwardly of the through hole of the gate, the connection is fulfilled. Therefore, the connecting structure can be simplified whereby to improve maintainability.

Further, since the first cowling and the second cowling are divided in front and in the rear, only a knee grip part which is easily scratched can be replaced, and the connecting section can be located in a good position while providing the cowling fastening structure capable of enduring traveling air.

Moreover, since the connecting section between the first cowling and the second cowling is arranged in the upward and downward direction of the vehicle, and the first and second cowlings are fastened to the vehicle above and below the connecting section, the rotational movement of the first cowling and the second cowling can be more steadily prevented, and the stress imposed on the connecting section can be further reduced.

Furthermore, since the long sides of the through hole are arranged in parallel in relation to a primary vibration of the engine, the primary vibration of the engine is received by the leg portions of the gate, whereby it is possible to decrease wear of the connecting section due to the clip, so that a replacement cycle of the clip can be extended.

Further, the connecting structure between the first cowling and the second cowling can be simplified, and the cowling can be small-sized.

According to the second aspect of the present invention, the first cowling and the second cowling can be prevented from rotational movement due to the travelling air, respectively. In addition, the stress imposed on the connecting section is further reduced, whereby the connecting section and the cowling can be decreased in size.

According to the third aspect of the present invention, since the fastening sections are fastened by a screw or by insertion, good fastening can be obtained with respect to the first cowling and the second cowling.

According to the fourth aspect of the present invention, since the linear portion of the mating line is arranged in parallel with the long side of the through hole, a portion necessary for connection such as an overlapping portion or the like in the contact section is reduced whereby the cowling can be small-sized.

In addition, in the case of being subjected to such stress from an external surface of the cowling as to open the connecting section, slippage of the connecting section is received in a longitudinal direction of the through hole, so that the stress imposed on the through hole can be reduced.

BRIEF DESCRIPTION OF THE DRAWINGS

FIG. 5-A is a cross sectional view taken on line 5-5 of FIG. 2 and FIG. 5-B is a cross sectional view as seen in the direction of an arrow X1 of FIG. 5-A;

FIG. 6-A is a view of a through hole as seen in the direction of an arrow Z1 of FIG. 5-A and FIG. 6-B is a perspective view of a gate as seen from the inside of a vehicle body;

BEST MODE FOR CARRYING OUT THE INVENTION

Figure 1:
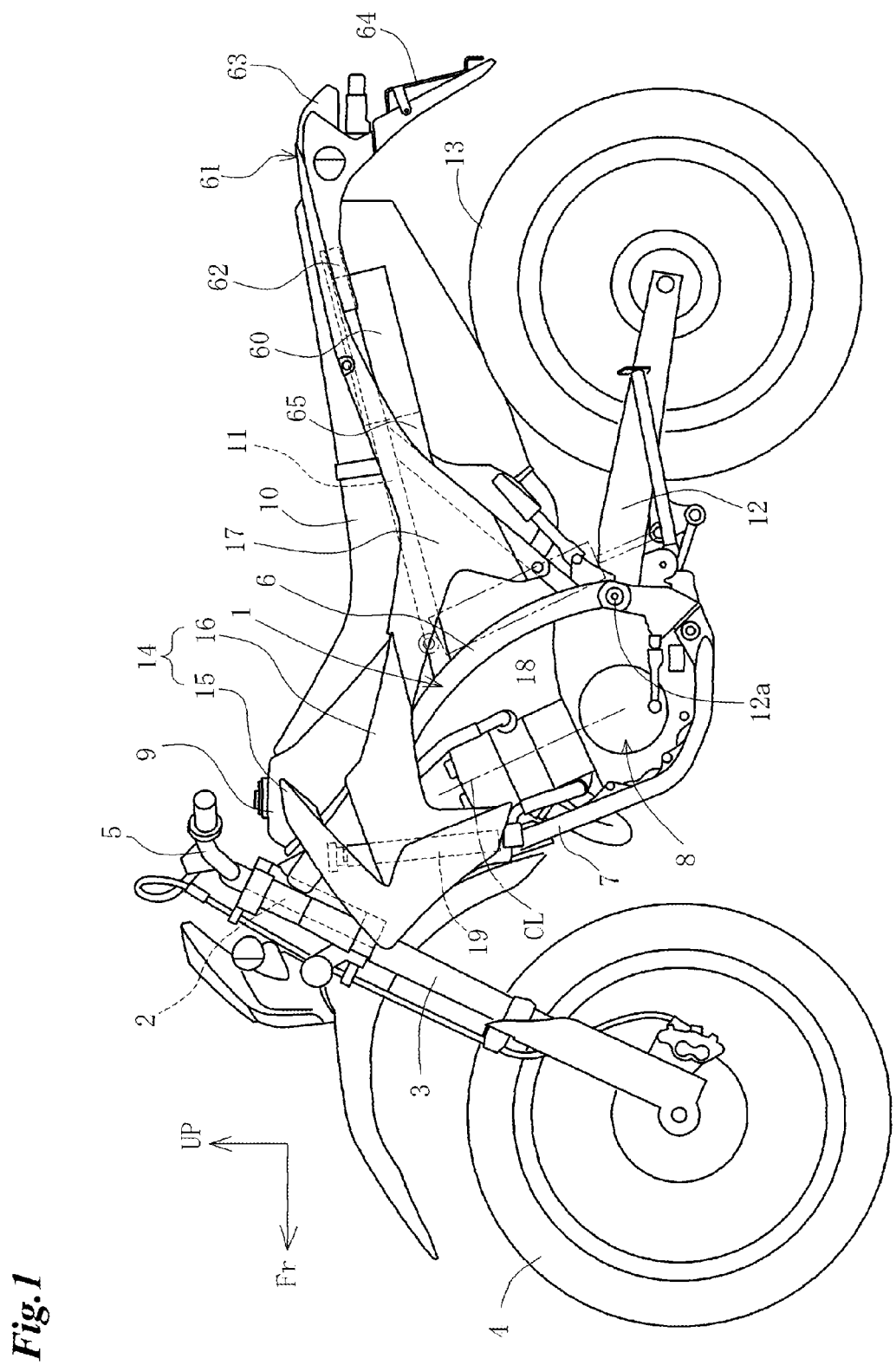
FIG. 1 is a side view of a two-wheeled motorcycle in accordance with the present invention.

Hereinafter, a first embodiment of the present invention will be described with reference to accompanying drawings. In the following description, each orientation such as upper, lower, left, right, front and rear shall be determined with reference to a vehicle to be applied. In the drawings, there are given an arrow UP which designates an upward direction, an arrow LH which designates a left direction and an arrow Fr which designates a forward direction. Moreover, there are given an arrow IN which designates an inward direction of a vehicle and an arrow OUT which designates an outward direction of the vehicle. In addition, each orientation of a clip such as upper, lower, left, right, front and rear shall be determined with reference to an illustrated state of FIG. 8.

FIG. 1 is a left side view of an off road motorcycle as an example of a straddle type vehicle in accordance with an embodiment of the present invention.

A pair of left and right front forks 3 is pivotally supported through a head pipe 2 which is provided in a front end portion of a vehicle body frame 1. A front wheel 4 is carried on a lower end of the front forks 3. The front wheel 4 is steered by a handle 5 which is connected to an upper end of the front forks 3.

The vehicle body frame 1 includes a main frame 6 and a down frame 7. An engine 8 is supported between the main frame 6 and the down frame 7. The main frame 6 passes above the engine 8 in such a way as to extend obliquely downwardly from the head pipe 2. Then, it extends downwardly on the rear of the engine 8. The down frame 7 extends obliquely downwardly in front of the engine 8 in the rearward direction from the head pipe 2 and then passes below the engine 8 in the rearward direction thereby to be connected to a rear end of the main frame 6.

On an upper side of the main frame 6 there is supported a fuel tank 9 in the rear of which a seat is arranged in a state of being supported by a pair of left and right seat rails 11. The seat rails 11 extend obliquely upwardly in the rearward direction from the main frame 6. On the rear end portion of the main frame 6, a rear swing arm 12 is swingably journaled through a pivot 12a. A rear wheel 13 is carried by a rear end portion of the rear swing arm 12.

Each lateral side of the vehicle body frame 1 is covered with a tank cowling 14. This tank cowling 14 is composed of a front cowling 15 and a rear cowling 16 which are formed as separate members. The front cowling 15 and the rear cowling 16 correspond to a first member and a second member of the present invention, respectively, and are connected to each other in such a way as to be referred to later. A rear end portion of the rear cowling 16 is connected to a side cowling 17 which covers a lower side of the seat 10. The tank cowling 14 and the side cowling 17 are provided left and right in pairs, respectively.

A luggage box 60 is arranged on the inside of the side cowling 17 and supported by the seat rails 11. In addition, a tail light assembly 61 projects rearwardly from a lower side of a rear end portion of the side cowling 17. The tail light assembly 61 is supported at the front end portion thereof by the seat rails 11 and connected to the luggage box 60 in a detachable fashion.

Figure 2:
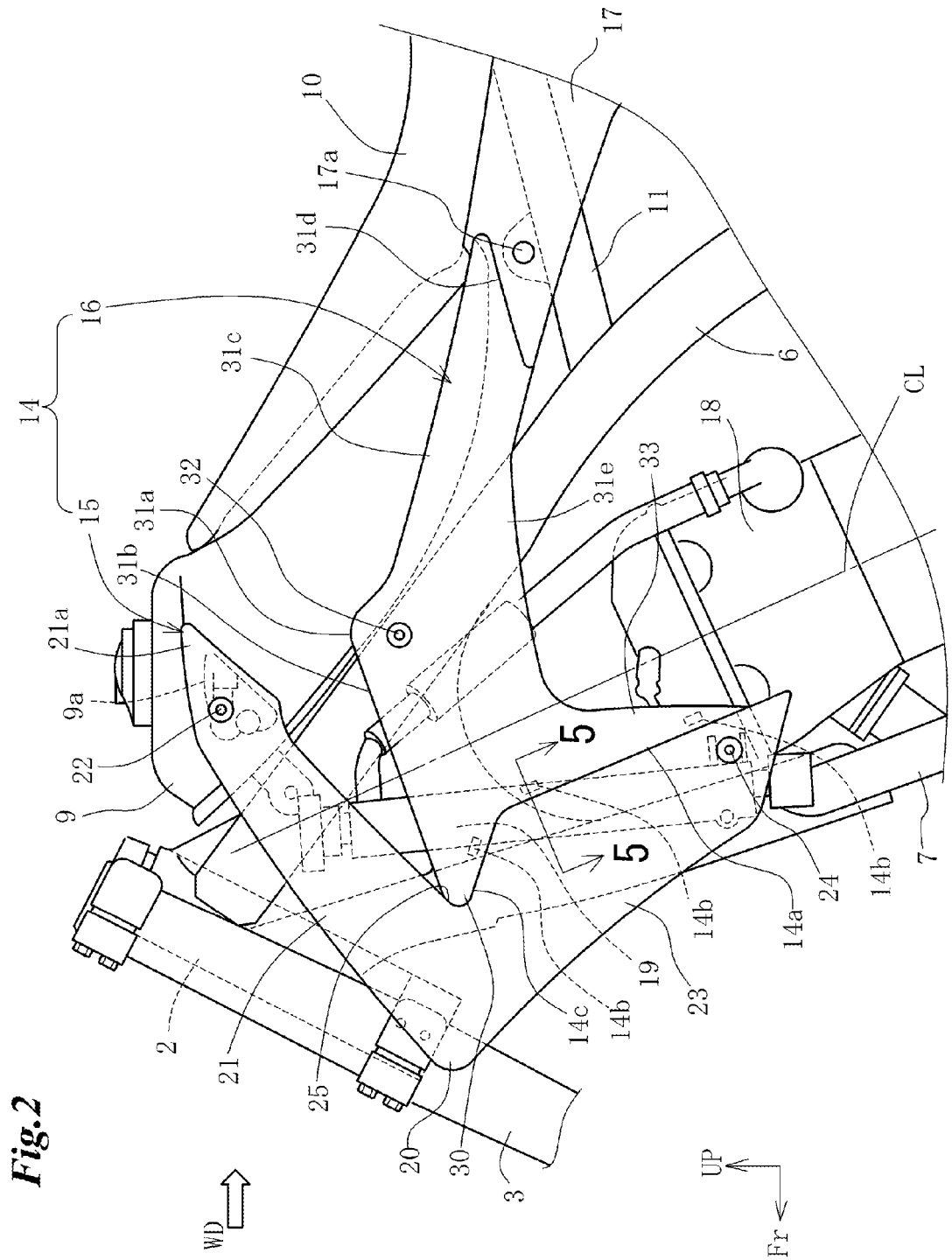
FIG. 2 is a side view of a front part of a vehicle.
Figure 3:
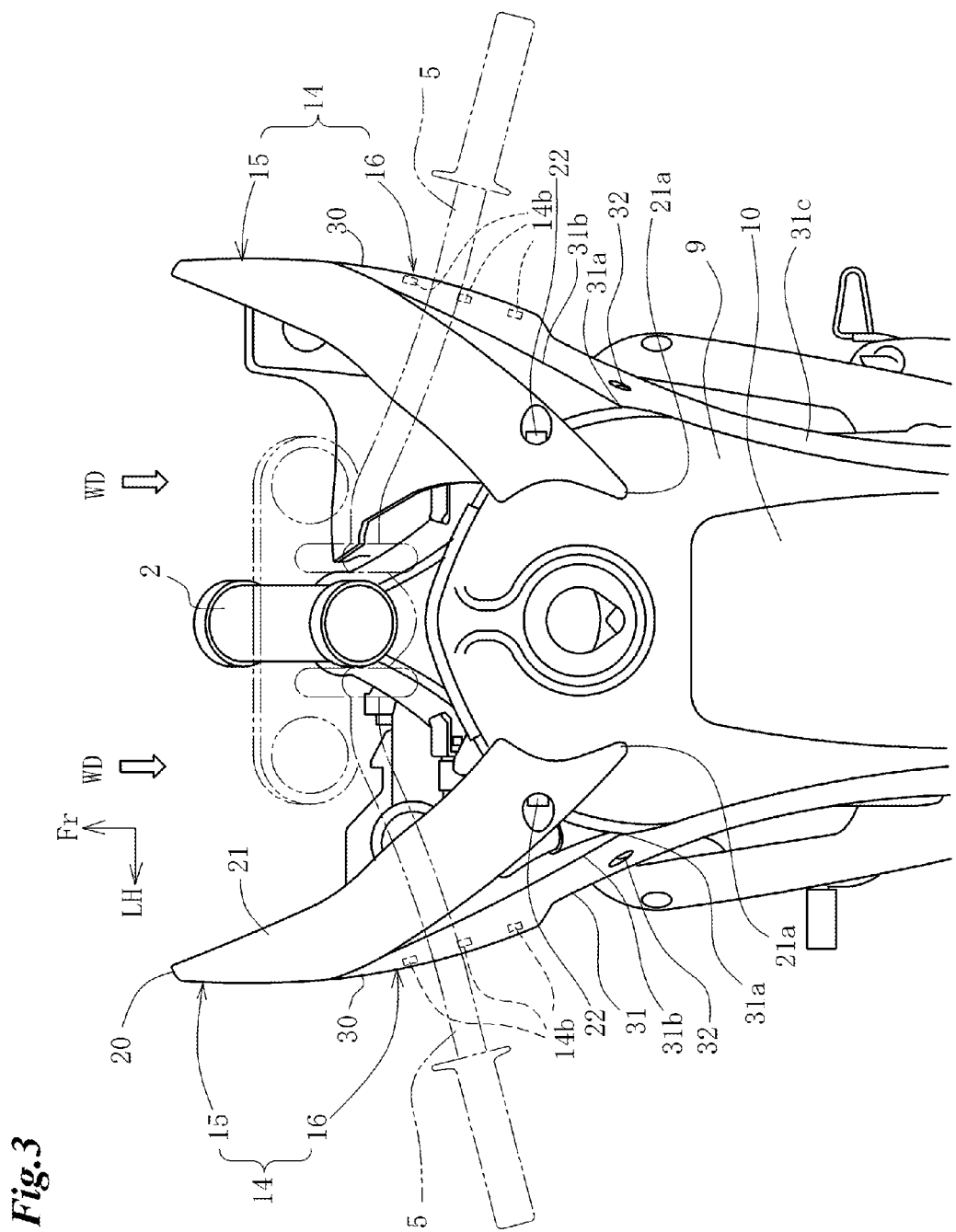
FIG. 3 is a plan view of the front part of the vehicle.
Figure 4:
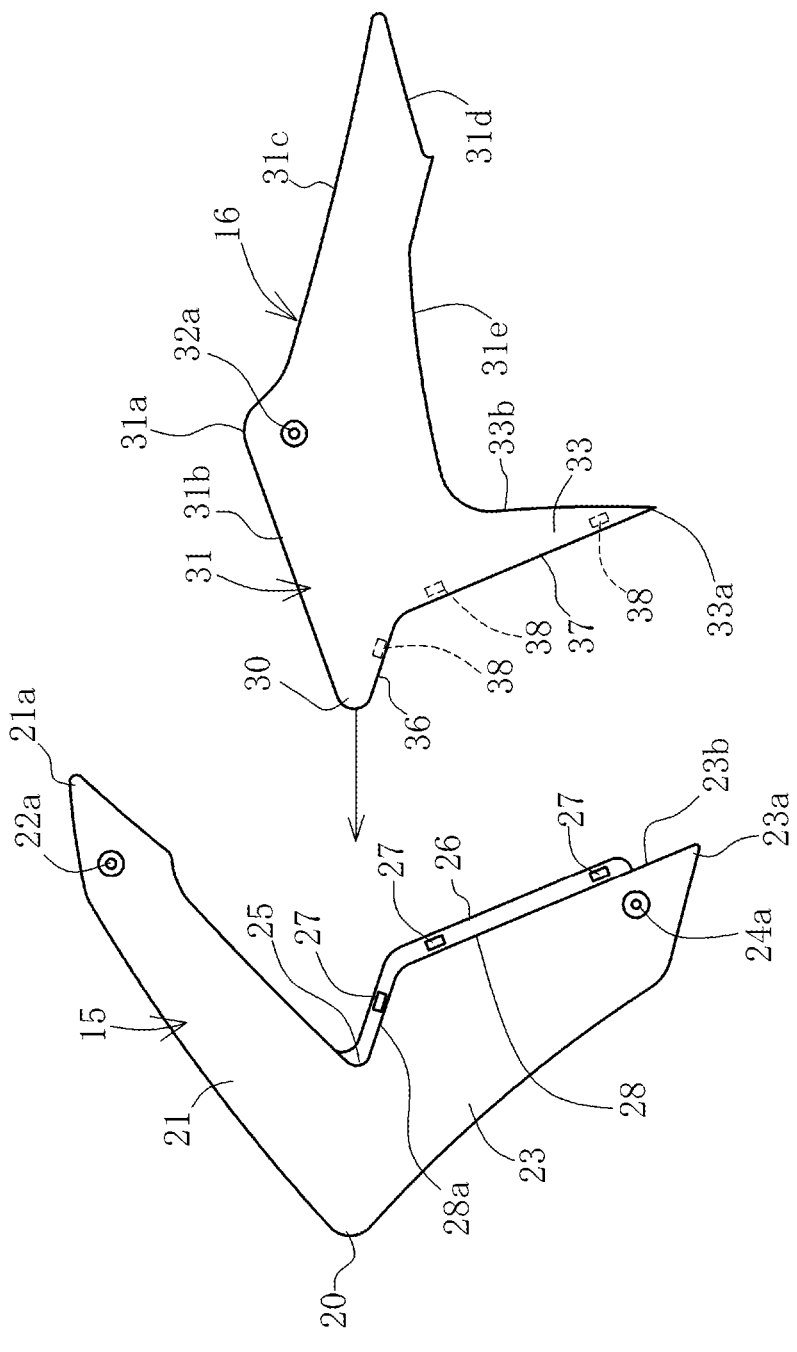
FIG. 4 is a view showing side view configurations of a front cowling and a rear cowling in a separated condition.

Referring to FIGS. 2 to 4, the front cowling 15 is a vehicle covering member for covering a part extending from a forward lateral side of the fuel tank 9 to an upper front portion of a cylinder section 18 of the engine 8 and is formed of a proper rigid material such as synthetic resin or the like. The front cowling 15 is formed of substantially a forwardly projecting arrow shape in a side view. A front end portion 20 of the front cowling 15 overlaps with an outer lateral side of the front fork 3, and an upper section 21 thereof extends obliquely upwardly in the rearward direction and passes across the main frame 6 upwardly thereby to overlap with a front lateral surface of the fuel tank 9. An upper distal end 21a of the front cowling 15 is fastened by a bolt 22 to a stay 9a which is formed on the lateral surface of the fuel tank 9.

The bolt 22 corresponds to a fastening by a screw according to the present invention. By the way, it is possible to provide the fastening by insertion such as a fastener of the type that completes the fastening merely by inserting a lock member.

A lower section 23 of the front cowling 15 extends obliquely downwardly in the rearward direction while overlapping with a lateral side of the down frame 7, and a lower end 23a thereof is fastened by a bolt 24 to a lower part of a radiator 19. The radiator 19 is located to the rear of the down frame 7 and supported by the main frame 6 and the down frame 7. Therefore, the lower section 23 is supported through the radiator 19 on the vehicle body frame 1. A recess section 25 is formed between a rear portion of the upper section and a rear portion of the lower section 23. The recess section 25 is concaved forwardly at the rear of the front end portion 20.

The rear cowling 16 includes a front section 30 which projects forwardly in an acute angled shape, an upper section 31 extending rearwardly from the front section 30 and having an upper edge portion in a generally mountain shape in a side view, and a lower section 33 extending downwardly. The front section 30 extends into the recess section 25 of the front cowling 15. The upper section 31 is fastened at a mountain shaped apex portion 31a thereof to a lateral surface of the main frame 6 by a bolt 32. A front edge portion 31b located forwardly of the apex portion 31a forms a space of an acute angled triangle between itself and a rear edge portion of the upper section 21.

A rear edge portion 31c of the rear cowling 16 located rearwardly of the apex portion 31a extends rearwardly while overlapping with a lower lateral surface of the fuel tank 9, and a rear end portion 31d thereof is in contact with an forward end portion of the side cowling 17. The forward end portion of the side cowling 17 is fastened to a seat rail 11 side by a bolt 17a.

A lower edge portion 31e of the upper section 31 is located above the cylinder section 18 so as to allow the cylinder section 18 to be exposed. By the way, the lateral surface of the fuel tank 9 is a part that the driver uses as a knee grip, and the rear cowling 16 is located within a range to be gripped by knees of the driver, whereby the rear cowling 16 contributes to allowing the driver to have good feeling with respect to a knee grip part.

The lower section 23 of the front cowling 15 and the lower section 33 of the rear cowling 16 are connected to each other in a state of forming a linear mating line 14a. The mating line 14a is inclined forwardly at the upper part thereof in such a way as to extend forwardly in the upward direction and is substantially in parallel with a cylinder axis CL. With respect to the relationship with the cylinder axis CL, the mating line 14 may have various angles relative to the cylinder axis CL, to the extent it does not lie at right angles to the cylinder axis CL.

The front cowling 15 and the rear cowling 16 are connected along the mating line 14a at a connecting section 14b (to be referred to in detail later). The connecting section 14b is provided in multiple places (three places in this embodiment) in the upward and downward direction.

By the way, a linear mating line 14c is also formed between an edge facing the recess section 25 of the lower section 23 of the front cowling 15 and the front section 30 of the rear cowling 16. However, this mating line 14c is more inclined than the mating line 14a and intersects the cylinder axis CL.

The lower section 33 of the rear cowling 16 is a portion extending in a lower direction continuously from the front section 30 in an acute angled triangle shape. A distal end 33a of the lower section 33 is overlapping with an upper front lateral surface in the vicinity of a bolt 24 and an upper section of a rear edge portion 33b of the lower section 33 is curved at the upper part thereof and extends continuously to the lower edge portion 31e.

As shown in FIG. 4, a flange 26 is provided in a rear edge portion 23b of the lower section 23. This flange 26 extends along the rear edge portion 23b in the upward and downward direction and an upper part of the flange 26 reaches the inside of the recess section 25. Through holes 27 which form the connecting sections 14b and which extend in the upward and downward direction are provided in multiple places in a part of the flange 26 located below the recess 25. In this embodiment, there are provided three through holes 27 one of which is located in a portion of the flange 26 extending parallel to the mating line 14c (FIG. 2) and other two of which are located in a portion of the flange 26 extending parallel to the mating line 14a (FIG. 2).

The flange 26 is in the shape of a step which is stepped inwardly of the vehicle body to such a degree as to correspond to a thickness of the rear cowling 16. An upper connecting edge portion 36 provided in the front section 30 of the rear cowling 16 and a lower connecting edge portion 37 provided in the lower section 33 are fitted to an external surface of the flange 26.

The upper connecting edge portion 36 and the lower connecting edge portion 37 of the rear cowling 16 fitted to the flange 26 come in contact with a step upper section 28a and a step 28 which are formed along the flange 26, whereby the mating line 14a is formed on these contact sections. An outer surface of the front cowling 15 is formed flush with an outer surface of the rear cowling 16.

Gates 38 which are inserted into and pass through the through holes 27 are provided in the upper connecting edge portion 36 and the lower connecting edge portion 37 and project inwardly of the vehicle body. The through hole 27 and the gate 38 constitute the connecting section 14b. The through holes 27 and the gates 38 correspond in number with the connecting sections 14b and are provided in the upward and downward direction along the mating line 14a.

The step 28 corresponding to the lower connecting edge portion 37 is of a linear shape extending substantially in parallel with the cylinder axis CL.

By the way, although the step upper section 28a of the step 28 corresponding to the upper connecting edge portion 36 is also formed in a linear shape, it is inclined large and does not extend parallel to the cylinder axis CL.

Reference characters 22a, 32a and 24a in FIG. 4 designate a bolt hole and fastening seat for the bolts 22, 32 and 24, respectively.

As shown in FIG. 3, the left and right tank cowlings 14 are expanded and opened laterally at the forward side thereof whereby it is possible to introduce a large amount of traveling air WD efficiently so as to flow in the direction of the radiator 19. At the same time, by introducing the large amount of traveling air WD, wind pressure applied to the front cowling 15 is increased, and the left and right front cowlings 15 receive force in such a way as to be expanded, so that large force by the wind pressure is applied to the connecting sections 14b of the rear cowling 16.

Next, the connecting structure between the front cowling 15 and the rear cowling 16 will be explained with reference to FIGS. 5 to 7.

In FIG. 5, the flange 26 of the lower section 23 is stepped inwardly of the vehicle body to such a degree as to correspond to a thickness T1 of the lower connecting edge portion 37, and the lower connecting edge portion 37 overlaps flush with the flange 26. Hereinafter, a surface of the flange 26 overlapping with the rear cowling 16 is referred to as an engaging surface 26a and a surface on the opposite side is referred to as an inner surface 26b. In addition, the upper connecting edge portion 36 (FIG. 4) is flush with the flange 26 in a similar way.

The gates 38 formed in the upper connecting edge portion 36 and the lower connecting edge portion 37 pass through the oblong through holes 27 formed on the flange 26. A portion of each of the gates 38 projects inwardly of the vehicle body and is connected here by a clip 40 (to be referred to in detail later).

The connecting section 14b by the through hole 27 of the front cowling 15 and the gate 38 of the rear cowling 16 is not exposed outside since the through hole 27 is located inside the rear cowling 16 and the gate 38 projects inwardly of the vehicle body with respect to the rear cowling 16.

As shown in FIG. 6-A, the through hole 27 is of a rectangular shape and has short sides 27a and long sides 27b. The length of the short side 27a is designated D1 and the length of the long side 27 is designated E1.

Further, the direction parallel to the short side 27a is designated X direction and the direction parallel to the long side 27b is designated Y direction. In addition, these X and Y are also orthogonal biaxial directions on a plane of the flange 26 in which the through hole 27 is formed, and the direction of an arrow X1 of FIG. 5 extends along this X direction.

As shown in FIG. 6-B, the gate 38 is a member of generally U-shape which projects integrally from the lower connecting edge portion 37 in the inward direction of the vehicle body, and includes a pair of opposed leg portions 38a extending in parallel and a bridge portion 38b connecting projecting ends of the leg portions 38a. The longitudinal direction of the bridge portion 38b corresponds to the longitudinal direction of the gate 38. A space surrounded by the leg portions 38a and the bridge portion 38b forms a through hole extending in the X direction.

The pair of opposed leg portions of the gate 38 is of a rectangular shape in cross section (see FIG. 7) and has a short side 39a and a long side 39b. In addition, a surface to which the short side 39a belongs is an end surface 39c, and a surface to which the long side 39b belongs is a lateral surface 39d. Moreover, a surface of the lateral surface 39d to come into contact with the short side 27a of the through hole 27 is referred to as an outer lateral surface while a surface on the opposite side is referred to as an inner lateral surface. The lateral surface and the outer lateral surface are given common reference character 39d and, if necessary to be distinguished from the inner lateral surface, they are designated 39e.

As shown in FIGS. 5-A and 5-B, when widths of the leg portion 38a and the bridge portion are D2 and a length of the bridge portion 38b (an interval between the opposed leg portions 38a) is E2, D1 is approximately equal to D2 and E1 is approximately equal to E2. However, the gate 38 is slightly reduced in size to such a degree that the gate 38 can be engaged with the through hole 27.

In addition, when a thickness of the leg portion 38a is t1, the widths D2 of the leg portion 38a and the bridge portion 38b are larger than t1.

Further, a projecting height H1 of the gate 38 is about H2 larger than a thickness T2 of the flange 26. This height H2 is a height of the gate 38 projecting from the inner surface 26b of the flange 26.

When a width between the inner surface 26b of the flange 26 and the bridge portion 38b is H3 and a thickness of the bridge portion 38b is t2, t1 H3 is approximately equal to H2.

A reference character H5 in FIG. 5-A designates a projecting height of an engaging rib 45 (to be referred to later) in relation to the inside of the through hole 14.

Figure 7:
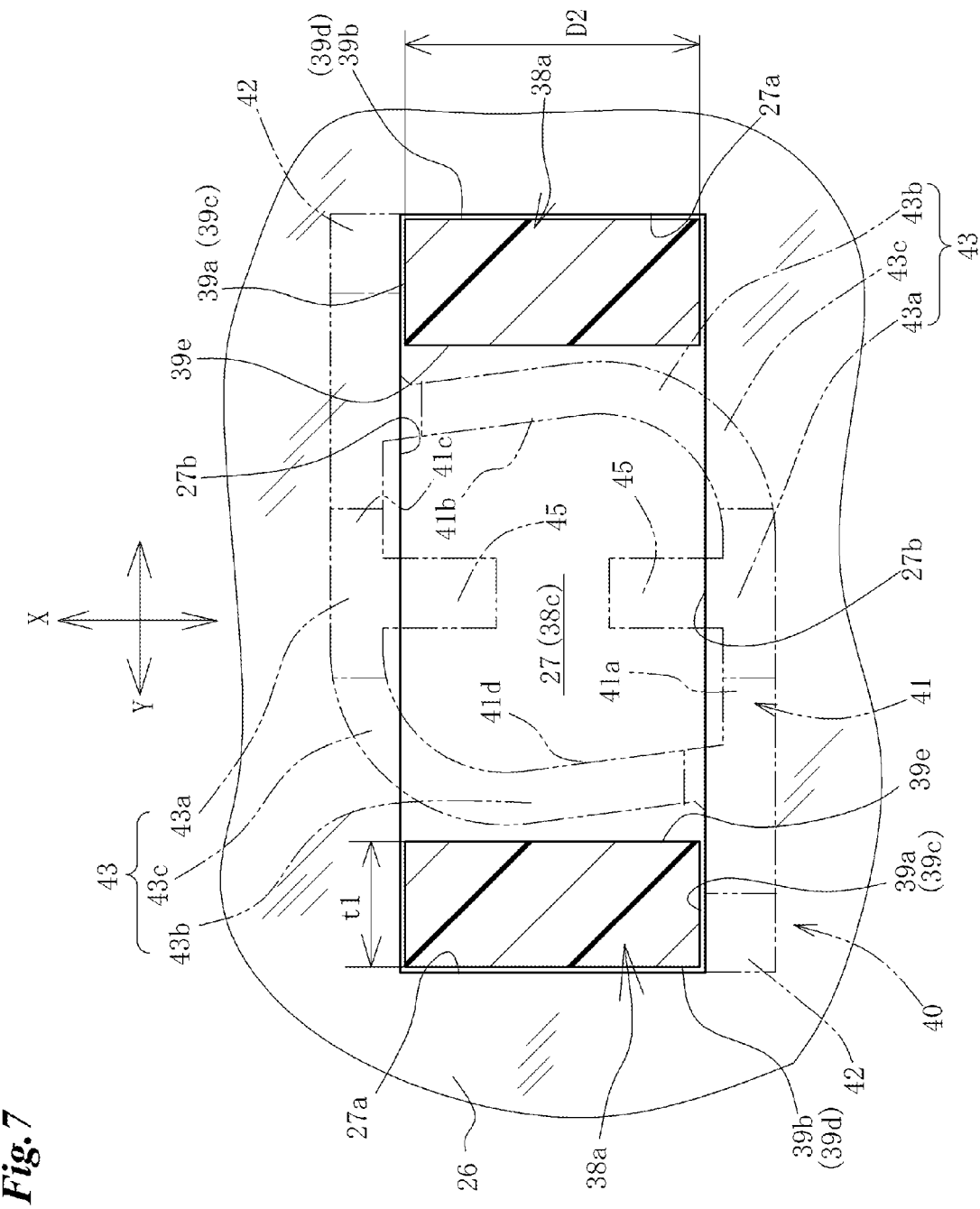
FIG. 7 is a cross sectional view taken on line 7-7 of FIG. 5-B.

FIG. 7 is a cross sectional view taken on line 7-7 of FIG. 5-B in a condition where the gate 38 passes through the through hole 27.

The pair of opposed leg portions 38a of the gate 38 is located inside the through hole 27, and the outer lateral surfaces 39d are in contact with the short sides 27a of the through hole 27 while the end surfaces 39c are in contact with the long sides 27b of the through hole 27. By virtue of this construction, the gate 38 and the through hole 27, namely, the front cowling 15 and the rear cowling 16 are fixed in position so as not to be moved relative to each other in X and Y direction.

By the way, the short side 39a has the length corresponding to the thickness t1, and the long side 39c has the length corresponding to D2.

In this condition, the clip 40 is inserted into a connecting space 38c (a space between the inner surface 26b of the flange 26 and the bridge portion 38b in the inner space of the gate 38) which is formed in a state of the gate 38 passing through and projecting from the through hole 27, whereby the clip 40 comes into contact with the bridge portion 38b and the inner surfaces 26b of the flange 26 in the vicinity of the long sides 27b of the through hole 27, so that the gate 38 is prevented from coming off the through hole 27 and retained in a connecting condition.

The clip 40 is a small sized clip made of resin and includes a peripheral frame portion 41 of substantially a quadrilateral shape and a pair of wing portions 42 being located diagonally with respect to the peripheral frame portion 41 and extending integrally in opposite directions to each other. An end surface of the peripheral frame portion 41 located on the side of the bridge portion 38b functions as a fastening surface 43 and an opposite surface overlapping with the inner surface 26b of the flange 26 functions as a bearing surface 44. The fastening surface 43 varies in height and is provided with a lowest portion 43a and a top portion 43b as a highest portion. The bearing surface 44 is a flat surface to come into contact with the inner surface 26b of the flange 26.

The clip 40 is configured to turn between a fixed position (the position shown in the drawing) and an inserted position (not shown in the drawing) to be rotated about 90° in the counterclockwise direction in a plane shown in the drawing.

In the fixed position of the clip 40, the peripheral frame portion 41 is provided with four sides 41a, 41b, 41c and 41d. The sides 41a and 41c are opposed in pairs and the sides 41b and 41d are opposed in pairs.

In the fixed position of the clip 40, the sides 41a and 41c abut on outer sides of the long sides 27b in pairs and are located externally to the gate 38. In addition, another pair of sides 41b and 41d enters, one each, the insides of the pair of leg portions 38a forming the inside of the gate 38.

One of the wing portions 42 extends from the side 41a to the left side in the drawing in the direction generally parallel to the long side 27b and comes into contact with one (one on the lower side in the drawing, for instance) of the end surfaces 39c located in one side (the left side in the drawing, for instance) of the leg portions 38a. One end of the neighboring one side 41d is continuously connected through the wing portion 42 to the left side in the drawing of the side 41a. The right side in the drawing of the side 41a is continuously connected to the neighboring other side 41b through a round portion 43c.

The opposed side 41c is of symmetrical configuration and the wing portion 42 extends from the side (the right side in the drawing, for instance) connected to the neighboring one side 41b, to the right side in the drawing thereby to abut on one side (an upper side in the drawing, for instance) of the end surfaces 39c located on the leg portion 38a on the right side in the drawing, for instance. The side 41c and the neighboring other side 41d are continuously connected through a round portion 43c to each other.

The lowest portions 43a of the fastening surfaces 43 are provided on the sides 41a and 41c. The top portions 43b are provided on the sides 41b and 41d. In the fixed position of the clip 40, the top portions 43b neighbor on the leg portions 38a of the gate 38 and come in contact with the inner surface (the surface located on the side of the connecting space 38c) of the bridge portion 38b.

The engaging ribs 45 are integrally provided on the insides of the sides 41a and 41c. In the fixed position of the clip 40, the engaging ribs 45 project from the bearing surface 44 into the through hole 27 of the flange 26 and are engaged with the inner surfaces 27c of the long sides 27b facing the through hole 27.

Figure 8:
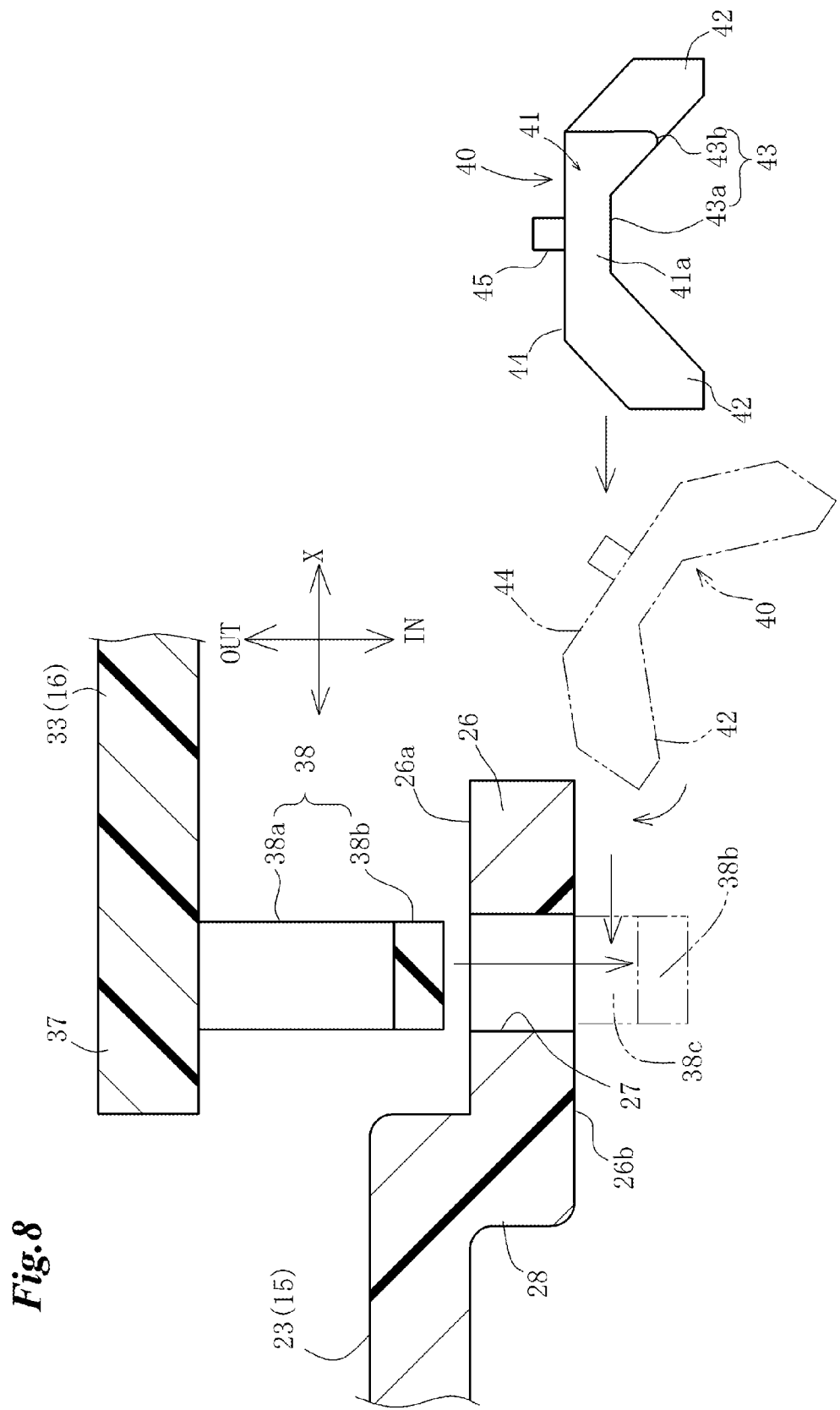
FIG. 8 is a cross sectional view showing steps of inserting the gate into the through hole and fitting a clip therein.

Next, the connecting method of the clip 40 will be explained with reference to FIG. 8. FIG. 8 is a cross sectional view similar to FIG. 5-A, showing the gate 38 and the through hole 27 in the separated condition. First, the gate 38 is inserted into and passes through the through hole 27. In this condition, the clip 40 is inserted into the connecting space 38c. At this stage, the clip 40 is in a position to be inserted, the wing portion 42 extends in parallel with the X direction. The wing portion 42 is inserted first into the connecting space 38c in the direction orthogonal to the long sides 27b of the through hole 27.

At that time, as shown in FIG. 5-A, since the height H4 (the interval between the highest portion of the wing portion 42 and the bearing surface 44) of the clip 40 is larger than the height H3 (namely, the width of the inserting opening) between the bridge portion 38b and the flange 27, the wing portion 42 is inclined as shown in FIG. 8 and inserted into the connecting space 38c, whereby the engaging ribs 45 enter the connecting space 38c and the bearing surface is arranged to allow the inner surface 26b of the flange 26 to extend in parallel.

After that, the clip 40 is turned about 90° and latched in position. This turn and latch type of clip is referred to as a turn clip.

Next, the operation of this embodiment will be explained.

As shown in FIG. 2, the tank cowling 14 is divided forwardly and rearwardly to form the first cowling 15 and the second cowling 16. The first cowling 15 and the second cowling 16 are connected by the connecting sections 14b arranged in the upper and lower direction, and the mating line 14a extends substantially in parallel with the cylinder axis CL while the upper mating line 14c is inclined in such a way as to diagonally intersect the cylinder axis CL. Moreover, the fastening sections by the bolts 22, 24, 32 to the vehicle side are provided on the upper and lower sides of the connecting sections 14b.

Accordingly, only the rear cowling 16 constituting the knee grip part which is easily scratched can be replaced by dividing the tank cowling 14 in front and in the rear, and the connecting sections 14b can be located in a good position while providing the cowling fastening structure capable of enduring the traveling air.

Moreover, since the first cowling 15 and the second cowling 16 are fastened at the multiple places respectively, the rotational movement of the first cowling 15 and the second cowling 16 can be more steadily prevented, and the stress imposed on the connecting sections 14b can be more reduced.

Further, since the first cowling 15 and the second cowling 16 are fastened by the bolts 22, 24 and 32 to the vehicle, the relative rotational movement by the traveling air between the first cowling 15 and the second cowling 16 can be prevented whereby the stress imposed on the connecting sections 14b can be more reduced. Therefore, the connecting sections 14b and clip 40 can be small-sized. In addition, since the fastening is performed by the fastening by the screw means or the fastening by insertion, the first cowling 15 and the second cowling 16 can be fastened to each other in good condition.

Further, the connecting sections 14b is composed of the rectangular through hole 27 and the U-shaped gate 38 which passes through the through hole 27. The long sides 27b of the through hole 27 are arranged in parallel with the mating line 14a or 14c. The gate 38 passes through the through hole 27, and the pair of leg portions 38a of the gate 38 comes into contact with the pair of opposed short sides 27a of the through hole 27. Therefore, the first cowling 15 and the second cowling 16 can be fixed in position in the X and Y directions in such a way as not to be moved relative to each other.

Further, since the clip 40 is capable of being fixed in such a way as to be prevented from coming off the through hole 27, the connecting section 14b composed of the through hole 27 and the gate 38 can be reduced in size so as to realize the simple connecting structure.

Particularly, as shown in FIG. 4, since the long sides 27b of the through hole 27 are arranged parallel to the steps 28 and 28a, the width of the flange 26 can be narrowed and the overlapping part between the first cowling 15 and the second cowling 16 can be decreased, whereby the first cowling 15 and second cowling 16 can be reduced in size. In addition, the clip 40 can be reduced in size.

Furthermore, since the primary vibration of the engine 8 is inputted along the cylinder axis CL in FIG. 2, the connecting section 14b is about to slip out of place in the Y direction in FIG. 7. However, since the long sides 27b of the through hole 27 are arranged in parallel with the Y direction and the lateral surfaces 39d of the leg portions 38a come into contact with the short sides 27a, the primary vibration is received by the surfaces of the leg portions 38a, so that the connection sections 14b can be prevented from slipping out of place in the Y direction.

Further, even if the slippage in the Y direction occurs, the mating line 14a is arranged parallel to the Y direction, whereby such deformation of the connecting section 14b that the mating section is opened can be prevented.

Since the mating line 14c is inclined with respect to the Y direction, the slippage also is about to occur in the direction orthogonal to the long sides 27b of the through hole 27. However, in this case, the end surfaces 39c of the leg portions 38a come into contact with the long sides 27b of the through hole 27 whereby the slipping is prevented. In addition, the slippage in the direction of the long sides 27b can be prevented when the lateral surfaces 39d of the leg portions 38a come into contact with the short sides 27a.

Moreover, the front section 30 is engaged in the recess section 25 and held down in the direction of the mating line 14c. Therefore, such deformation of the connecting section 14b that the mating section is opened can be prevented also in the region of the mating line 14c.

Further, as shown in FIG. 5-A, since the engaging ribs 45 also are located in the long sides 27b and come into contact with the inner surfaces 27c of the through hole 27 so as to slide on the inner surfaces 27c of the through hole 27, the wear of the engaging ribs 45 can be reduced. Although the engaging rib 45 is a member for preventing the movement of the intermediate portion in the longitudinal direction of the long side 27b of the through hole 27 with which the leg portions 38a do not come in contact, if it is provided on the short side 27a orthogonal to the Y direction, the friction between the short side 27a and the engaging rib 45 is increased, and they are worn out in a comparatively short period of time, whereby it is required to replace the clip 40 itself in a comparatively short period of time. However, when the engaging ribs 45 are arranged on the long sides 27b, such wear can be reduced and the durability of the clip 40 can be increased whereby to lengthen the replacement cycle.

Moreover, even if the through hole 27 is formed in the rectangular shape having the long sides 27b, the movement of the intermediate portions in the longitudinal direction of the long sides 27b can be prevented by the engaging ribs 45, whereby the employment of the rectangular through hole 27 of this type can be realized by the clip 40 having the engaging ribs 45.

Further, when receiving the large external force in the direction to open the connecting sections 14b, namely when receiving force in the direction orthogonal to the mating lines 14a and 14c, the end surfaces 39c of the leg portions 38a come into contact with the long sides 27b of the through hole 27 whereby the force can be received by the long sides 27b and it is possible to prevent the slippage in the direction to open the connecting sections 14b. Therefore, even if the large force is applied to the tank cowling 14 and the force is exerted in the direction to open the connecting sections 14b, the connecting sections 14b are hard to be opened.

In addition, since the end surfaces 39c of the leg portions 38a are stopped by the long sides 27b, the stress on the through hole 27 can be reduced.

Figure 9:
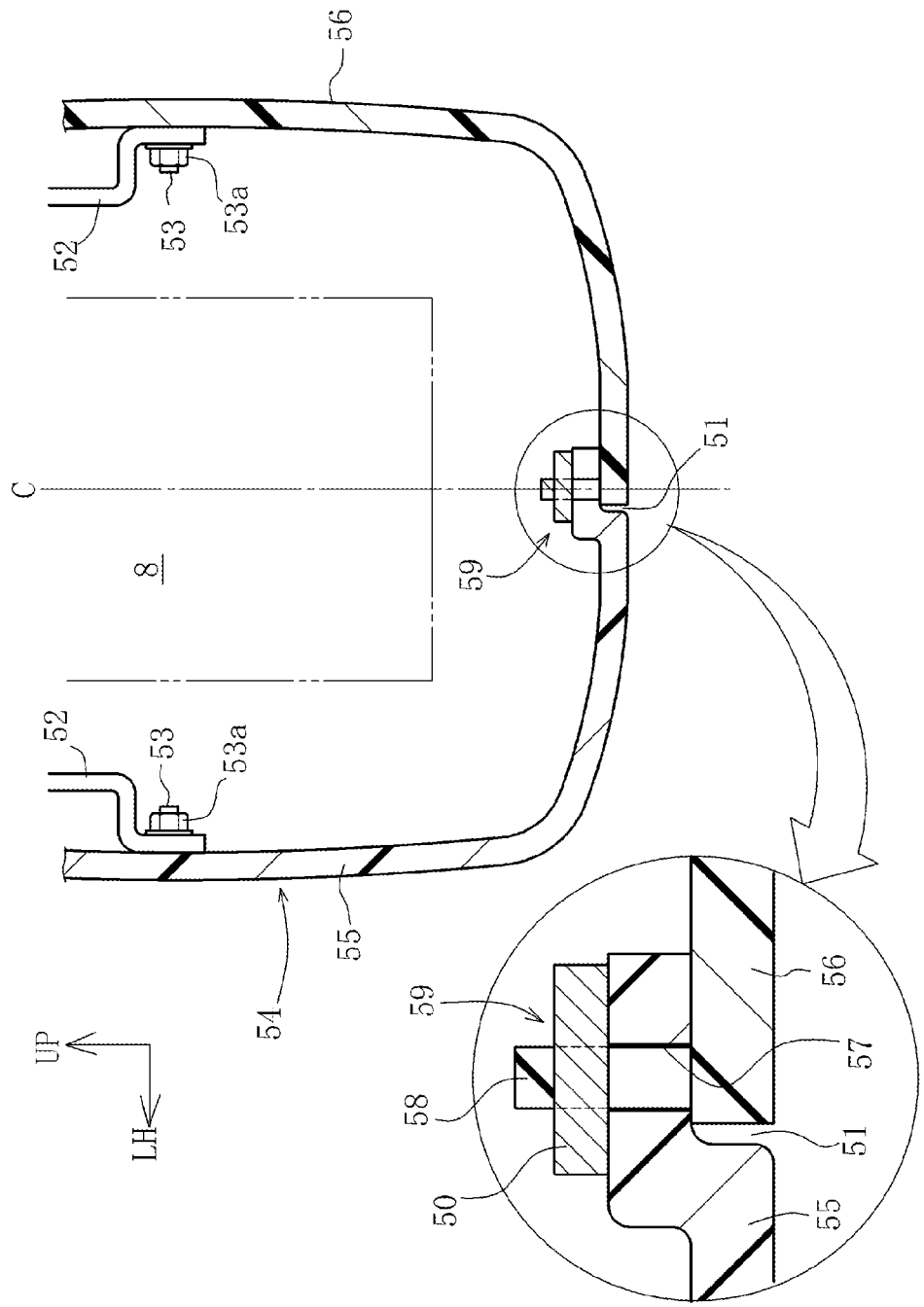
FIG. 9 is a cross sectional view showing a connecting structure of an under cowling in accordance with another embodiment.

Next, another embodiment will be explained. FIG. 9 shows the connecting structure between left and right under cowlings, wherein elements corresponding to these in the previously described embodiment are given like reference characters and an overlapping explanation is omitted. Accordingly, only the difference will be explained.

This embodiment relates to the mounting of the under cowling 54 which is not employed in the vehicle of the previous embodiment. The under cowling 54 is a vehicle cover of generally a U-shape in cross section which covers each lateral side and an under side of the engine 8, and is formed with left and right separate bodies composed of a left cover 55 and a right cover 56 to be connected under the engine 8. The left cover 55 and the right cover 56 correspond to the first member and the second member of the present invention, respectively.

When constituting a connecting section 59 by a through hole 57 provided in the left cover 55 and a gate 58 provided in the right cover 56, the left and right covers are connected by a clip 50 in the same way as the previous embodiment. The through-hole 57, the gate 58 and the clip 50 are similar in structure to the previous embodiment. Moreover, the through hole 57 is provided in such a manner that long sides thereof extend along a mating line 51 between the left cover 55 and the right cover 56. The mating line 51 extends parallel to a vehicle body center C in the forward and rearward direction of the vehicle (although in FIG. 9 the vehicle body center C is shown as a vertical line, it is a straight line horizontally extending in the forward and rearward direction in a plan view).

In addition, the left cover 55 and the right cover 56 are fastened at left and right sides of the engine 8 above the connecting section 59 to stays 52 provided on the vehicle body side, by a bolt 53 and a nut 53a. The bolt 53 is a stud bolt previously combined integral with each of the left cover 55 and the right cover 56. This bolt passes through one end of the stay 52 and is fastened by the nut 53a. The other end of the stay 52 is mounted on a vehicle body frame. By virtue of this structure, by fastening an upper part of the under cowling 54, mass of the under cowling 54 is not exerted on the connecting section 59.

Figure 10:
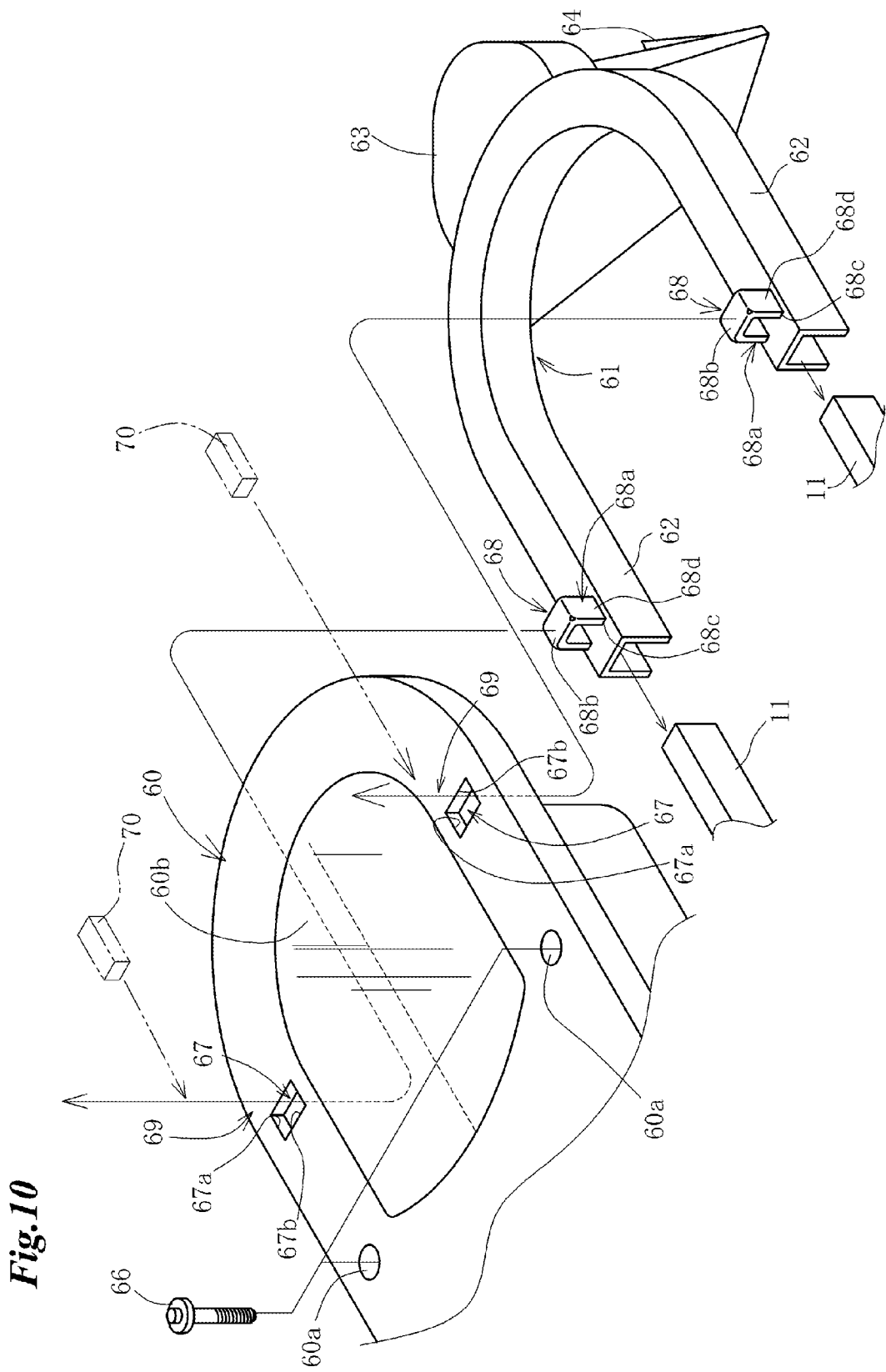
FIG. 10 is a view of assistance in explaining a mounting operation of a tail light assembly in accordance with a still another embodiment.

FIG. 10 is a still another embodiment and shows a mounting structure of a tail light assembly. In this embodiment, the first member is a luggage box 60 which is arranged under the seat 10, and the second member is a tail light assembly 61 provided in the rear of the vehicle body. The tail light assembly 61 is detachable and includes a mounting section 62 of generally a U-shape, a tail light 63 as a safety component part located in the rear of the mounting section 62, and a license plate 64 integrally provided on the lower side of the tail light 63.

The luggage box 60 is provided integral with the rear fender 65 (FIG. 1) arranged to cover the rear wheel 13 from above and is opened upwardly in such a way as to put in and take out goods when the seat 10 is brought to its open position. The luggage box 60 is fastened by bolts 66 onto the pair of left and right seat rails 11. Through holes 67 are formed left and right in the rear of the fastening sections by the bolts 66. The through hole 67 is of a rectangular shape and is arranged to extend long sides thereof in the left and right direction.

The mounting sections 62 are provided in pairs so as to correspond to the left and right seat rails 11, and formed in a downwardly open U-shape in cross section, respectively. The mounting sections 62 are mounted on the seat rails 11 in such a way as to be inserted in a plug-in fashion into the seat rails 11, and are fastened by proper fastening means such as a bolt, a fastener or the like. On upper surfaces of the mounting sections 62 there are integrally formed gates 68 each of which projects upwardly from the upper surface.

Then, the gates 68 are inserted into the through holes 67 so as to form connecting sections 69. When the connecting sections 69 are connected by clips 70 (a rough sketch being given in the drawing) similar to the clips 40, the tail light assembly 61 is connected easily to the luggage box 60.

When the clips 70 are removed, the tail light assembly 61 is able to be detached from the luggage box 60. Further, when the mounting sections 62 are unfastened from the seat rails 11, the tail light assembly 61 is able to be removed easily and rapidly from the seat rails 11. Accordingly, it is suitable for the vehicle of race specifications which does not require the mounting of the tail light assembly 61 at the time of race running.

Moreover, the tail light assembly 61 is heavy and vibrates in the upward and downward direction. However, since this heavy load is supported by the seat rails 11 and the long sides of the through holes 67 are arranged in the left and right direction, the end surfaces 68c of the leg portions 68a come into contact with the long sides 67b of the through holes 67 when the gates 68 are about to slip in the upward and downward direction, whereby the slippage can be prevented and the stress on the through holes 67 can be decreased owing to catching the leg portion 68a by the long sides 67b. Therefore, the member which is heavy and vibrates in the upward and downward direction, such as the tail light assembly 61 can be steadily connected.

Furthermore, when the rear end of the seat 10 is extended rearwardly to cover and hide the connecting sections 69 between the luggage box 60 and the tail light assembly 61, the safety component part can be prevented from being tampered with.

The present invention is not limited to the above described embodiments, and various modifications may be made therein without departing from the spirit and scope of the present invention. For instance, components parts to be covered by the present invention are not limited to the above described examples, and when a first member and a second member are connected to each other and fastened each to the vehicle, they may be sufficient for the component parts of the present invention. In addition, the straddle type vehicle of the present invention includes any of two-wheeled to four wheeled vehicles, and vehicles to be used for the purpose of on-road, off-road, racing or the like.

What is claimed is:

1. A connecting structure of vehicle component parts comprising:
a first member made of resin,
a second member made of resin, and
a clip for connecting the first and second members,
wherein:
the first member and the second member each are fastened to a vehicle,
the first member is provided with a rectangular through hole which has short sides and long sides, the second member is provided with a gate which passes through the through hole,
the gate is formed substantially in a U-shape which includes a pair of leg portions projecting from a surface of the second member and a top portion connecting each of projecting ends of the leg portions, the pair of leg portions is configured to be arranged along the short sides of the through hole when passing through the though hole, and
the clip connects the first member and the second member by engagement with the through hole and the gate in a condition where the gate passes though the through hole,
wherein the first member and the second member are a first cowling and a second cowling each of which covers a part of the vehicle,
wherein the first cowling and the second cowling form a tank cowling arranged on each lateral surface of a vehicle body of a straddle type vehicle, the first cowling and the second cowling are arranged in front and in the rear, a connecting section by the clip is arranged in an upward and downward direction of the vehicle,
and the fastening sections for fastening the first cowling and the second cowling to the vehicle are arranged above and below the connecting section, the fastening sections being fastened to the vehicle by a screw or by insertion;
wherein the straddle type vehicle has an engine supported on a vehicle body frame below the tank cowling, and a cylinder axis of the engine is arranged substantially in parallel with the long sides of the through hole, and
wherein, to latch the clip in position and prevent the gate from being removed from the through hole, the clip is turned from an inserted position to a fixed position, said inserted position being one in which the clip is inserted into a connecting space formed on an inside of a portion of the gate projecting from the through hole, and said fixed position being one in which the clip is received in the connecting space and the gate is prevented thereby from being removed from the through hole.

2. The connecting structure of vehicle component parts according to claim 1, wherein the first cowling and the second cowling are fastened to the vehicle respectively, and at least one of the first and second cowlings has a plurality of fastening sections.

3. The connecting structure of vehicle component parts according to claim 2, wherein a mating line formed in a contact section between the first cowling and the second cowling in the vicinity of the connecting section has a linear portion, and the linear portion is arranged in parallel with the long sides of the through hole.

4. The connecting structure of vehicle component parts according to claim 1, wherein a mating line formed in a contact section between the first cowling and the second cowling in the vicinity of the connecting section has a linear portion, and the linear portion is arranged in parallel with the long sides of the through hole.

5. The connecting structure of vehicle component parts according to claim 1, wherein a mating line formed in a contact section between the first cowling and the second cowling in the vicinity of the connecting section has a linear portion, and the linear portion is arranged in parallel with the long sides of the through hole.

* * * * *